(12) United States Patent
Pan et al.

(10) Patent No.: US 6,414,803 B1
(45) Date of Patent: Jul. 2, 2002

(54) MICRO MAGNETO-CONTROLLED OPTICAL PATH-GUIDING PLATFORM

(75) Inventors: Cheng-Tang Pan, Tainan Hsien; Min-Chieh Chou, Taipei; Sheng-Chih Shen, Hsino-Ying; Kun-Lung Lin, Chang-Hua Hsien; Yu-Hsi Chao, Hsin-Chu, all of (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 0 days.

(21) Appl. No.: 09/917,754

(22) Filed: Jul. 31, 2001

(51) Int. Cl.$^7$ .................................................. G02B 5/04
(52) U.S. Cl. ....................... 359/831; 359/833; 359/837
(58) Field of Search ................................. 359/831, 833, 359/837, 211, 210

Primary Examiner—Mohammad Sikder
(74) Attorney, Agent, or Firm—Bacon & Thomas

(57) ABSTRACT

A method of making a micro magneto-controlled optical path-guiding platform comprises an optical path-guiding platform, couples of the optical routes, a micro magneto-flux prism located at the intersection of the optical route on the topside of the platform, and a magnetic field generator oppositely mounted under the location of the micro magneto-flux prism of the platform bottom side respectively. Therefore, the reflection ratio and refraction ratio to the incident optical signal traveling through this designed micro magneto-flux prism will be completely manipulated by adjusting the magnetic field intensity that is generated by the magnetic generator. Conclusively, this invention can be used to change the traveling orientation of the optical route or control the optical energy intensity as desired.

11 Claims, 5 Drawing Sheets

MICRO MAGNETO-CONTROLLED OPTICAL PATH-GUIDING PLATFORM

BACKGROUND OF INVENTION

1. Field of Invention

This invention mainly develops a micro magneto-controlled optical path-guiding platform. Especially, it is functioned for optical route with a high switching rate. With its tiny volume and its low mass, this invention eventually goes with microball and/or non-spherical lens array for the batch forming and the precise positioning.

2. Description of the Prior Art

As far as we know the Internet system demands a wide-band operation extremely. To overcome this insufficient bandwidth plight, the optic communication is currently recognized as an optimal solution to the wire communication, which benefits by its economy and speedy. Furthermore, an optical switch can be widely used in the optic communication and electro-optical systems. The better the optical switch preformed, the lower loss the optical transferring and transmitting. In order to get a good optical signal and ensure the Internet quality, the optical switch has to be treated as a key component of the optical communication.

Traditionally, a mechanic-optical switch is adopted to process the optical signal transformation. With its large dimension, his switching rate is also limited. Moreover, manufacturer can't figure out a reasonable way to reduce production cost as expected. In recent years, some studies are dedicated in making the mechanic-optical switch by using MEMS (Micro Electro-Mechanic System) technique. Nowadays some papers had already published as:

Lucent's optical switch is adaptive for optical signal traveling through a small angle transformation. It owns multi-angular variation using a circular lens with two axial torque-spring mechanisms by MEMS technique. The incident optical signal will then be reflected from more than two different positions. With this specially designed lens-array, it can be functioned as a N×M switches.

Pendulous optical switch is adaptive for optical signal traveling through a large angle transformation. On the techniques adopts a static-electrical and erect-rotate lens to gain the 1×2 or On-Off switching function. A 2× optical switch can also be manufactured with MEMS technique. Consequently, its size, weight and cost can be highly reduced by applying the fiber positioning and the microball lens with MEMS technique. Another technique makes M×N optical switches by adopting wet-etching process, it simply fixes the traditional micro winding+iron and yoke+magnet under the cantilever beam. This mechanism then can drive the optical signal transformation with differently desired beam angles.

Although the aforementioned mechanic-opto switch owns some properties such as the wavelength distinction, the better channel isolation, the smaller sizing, the tiny mass and the lower power loss, but it still can't solve the optical transient problem efficiently. Conclusively, its short lifecycle and un-reliability dramatically limit the practical application of the mechanic-opto switch.

SUMMARY OF THE INVENTION

Hence, the primary aim of the present invention is to solve the drawbacks described above. In order to avoid the presence of the drawbacks described above, the present invention is to provide a micro magneto-controlled optical path-guiding platform. With this invention, the optical switch can exchange the refraction ratio and the reflection ratio. Physically the optical switch achieves the swapping signal transform by varying the external magnetic field intensity. It avoids not only the transient phenomena but also features small sizing, low mass, fast switching rate and easy-made. If it goes with microball and/or non-spherical lens array, it can be implement easily using the batch forming and the precise positioning.

DETAILED DESCRIPTION OF THE PREFERRED EMBODIMENTS

Figure 1:
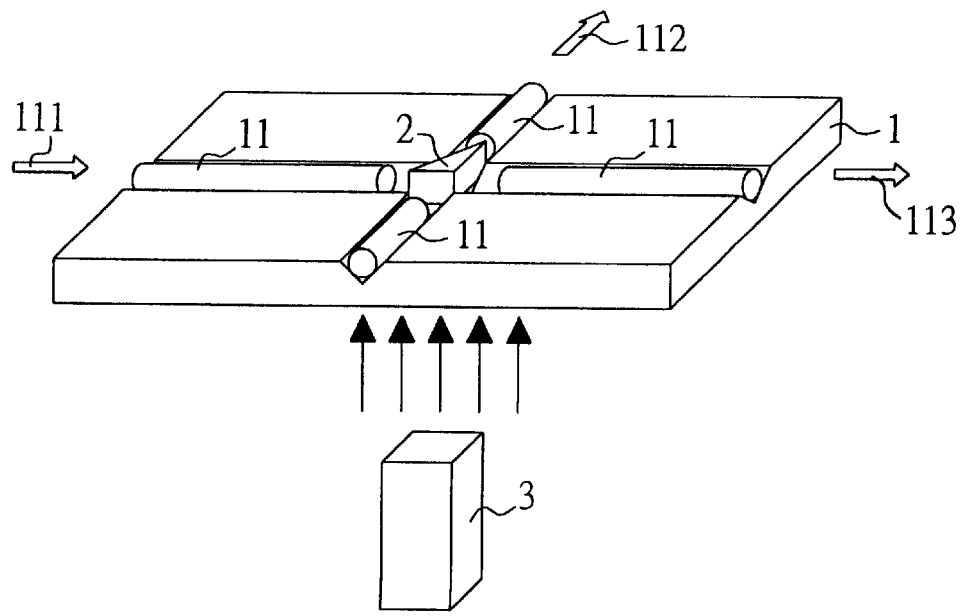
FIG. 1 The schematic drawing of this invention

The schematic drawing of this invention is clearly shown in the FIG. 1. The system architecture comprises an optical path-guiding platform 1 and couples of optical routes 11 which are arranged on the topside of the optical path-guiding platform 1, The micro magneto-flux lens 2 is located at the intersection of aforesaid optical routes. Moreover, one magnetic field generator 3 is mounted on the bottom side and is directly located under the micro magneto-flux lens 2. As soon as the incident light 111 goes through the magneto-flux lens 2, adjusting the magnetic intensity of the magnetic-field generator 3 will change the reflection ratio and the refraction ratio. Therefore the optical energy and optical route will be controlled by this invention.

The operation principle of this micro magneto-controlled optical path-guiding platform is adopting the magneto-optical Bragg diffraction to treat the optical signal. Herein two dominated factors as Faraday and Cotton-Mouton effects are considered.

(A) Faraday effect: Whenever the polarized light goes through an orthogonal magnetic field, the light's polarized orientation will be rotated with the specified angle. Assuming the magnetic field H which is formed by a L-length dimensional magneto-material, then a light goes through this material and his polarized orientation angle θ can be represented as θ=VLH, where V is the Verdet constant (B) Cotton-Mouton effect: If the magnetic field orientation is perpendicular to the light traveling direction, the refraction ratio of this optical route will be changed. Assuming the refraction index (n) of this optical route and the external magnetic field intensity (B) are known, and then the variation of the refraction index ($\Delta n$) can be expressed as $\Delta n = kB^2$, where k is a constant.

If we apply a RF signal with the polarized magnetic field onto a Ferro-magnetic wave-guide, this optical route will then generate a static-magneto wave. Whenever this static-magneto wave travels through two aforementioned effects, it will result in a grid phenomenon approximately. Consequently, a polarized light is traveling through this grid, and then the diffraction will be happened as expected. Therefore we can control the frequency of this static-magneto wave to exchange the light diffraction angle for achieving the optical switch function as desired.

According to the magneto-optics Bragg diffraction phenomenon, the light orientation will be exchanged as soon as the incident light 111 was traveling through the micro magneto-flux prism 2. And its orientation can be determined by the magnetic intensity that is an interaction between magnetic field generator 3 and micro magneto-flux prism 2. For a zero magnetic intensity, the reflect light 112 will be totally reflected when incident light 111 works on the micro magneto-flux prism 2. Oppositely the transmit light will be completely transmitted when incident light 111 through the micro magneto-flux prism 2, if the magnetic intensity is higher than the critical level. Conclusively, incident light 111 will be partially reflected to form a reflect light 112, and rest of the incident light 111 will be transmitted to form a transmit light 113. The corresponded distribution depends on the magnetic intensity from zero to the critical level. That is the subject to switch the light-signal traveling orientation by controlling the magnetic intensity f the magnetic field generator 3.

In order to gain more magnetic energy, the magnetic field generator 3 shall be modified with a higher depth-width ratio of the planar coil. Additionally, it can apply the thick-film optical coating and the electrical-casting techniques to increase the coil's effective area and its turns-number. Alternatively, it can be implemented to advance the permeability by using low-temperature and high-magnetism techniques to thicken the magnetic film's dimension. Moreover, it can also gain a higher magnetic energy by using a magneto-material with high permeability, which owns a specified ratio of the Nickel-Iron alloy.

Figure 2:
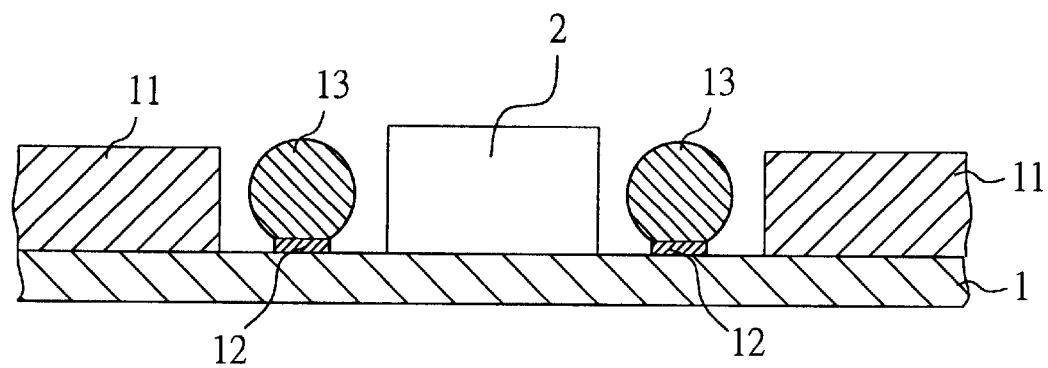
FIG. 2 The schematic drawing of this invented optic route-aligning element
Figure 3A:
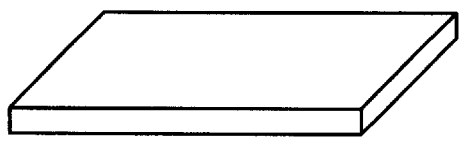
FIGS. 3A, 3B, 3C, 3D, 3E, 3F, 3G, 3H, The manufacturing flow chart of this invented micro magneto-flux prism 2
Figure 3B:
Figure 3C:
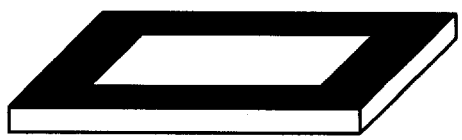
Figure 3D:
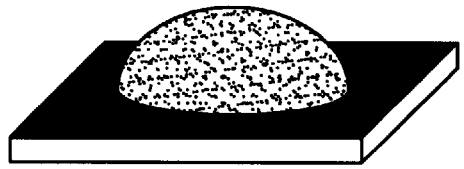
Figure 3E:
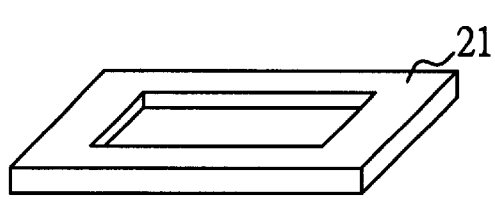
Figure 3F:
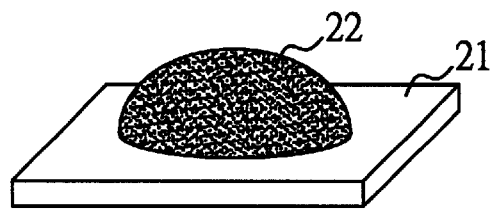
Figure 3G:
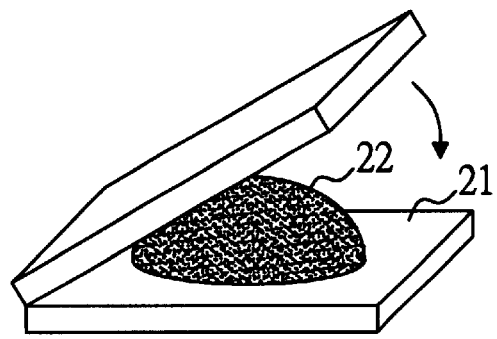
Figure 3H:
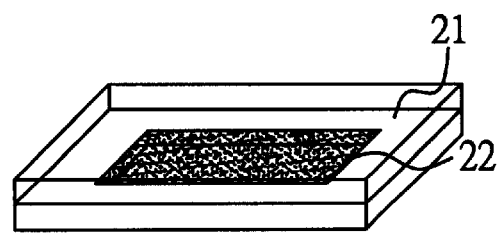

The schematic drawing of this invented optic route-aligning element is shown in FIG. 2. And it is particularly located within the optical route 11 that is on the surface of the optical guiding platfrom1 to form a substrate 12. Furthermore, this substrate 12 functions as a microball lens as to improve the alignment precision of the optical route by cross-action with each of these optic route-aligning elements.

The manufacturing flow chart of this invented micro magneto-flux prism 2 is shown in FIGS. 3A–3H. We consider the chemical etching method in this invention, and the detailed procedure is explained as following:

3A First uses the diamond cutter to divide the glass plate into several templates with a suitable dimension, then flush and clean the glass surfaces with detergent. Finally blow and dry the surfaces with Nitrogen gas in order to increase the adhesiveness between the glass and tapes.

3B Completely sticks a high-adhesive tape on this cleaned glass surfaces, and then it will be ready for etching process.

3C Uses a handy knife to remove the tape of the masked zone, then cleans the untapped surface with detergent, and blows the surface dry with gaseous Nitrogen before puts the glass templates on a horizontal platform.

3D Etching the untapped zone with few drops of Hydrogen-Fluoride solution, then the etched depth will be specified by controlling the solution density and etching time span.

3E Goes through the above steps, we can get a concaved hollow prism after cleaning and removing the tapes.

3F Puts a suitable magneto-flux 22 into slots of the concaved hollow prism.

3G Takes another cleaned flat glass and hold it on that concaved hollow prism form the lateral-side rims.

3H Removes the redundant magneto-flux 22 and cleans the body, then seals them tightly with the AB adhesives to form the magneto-flux prism 2.

Figure 4:
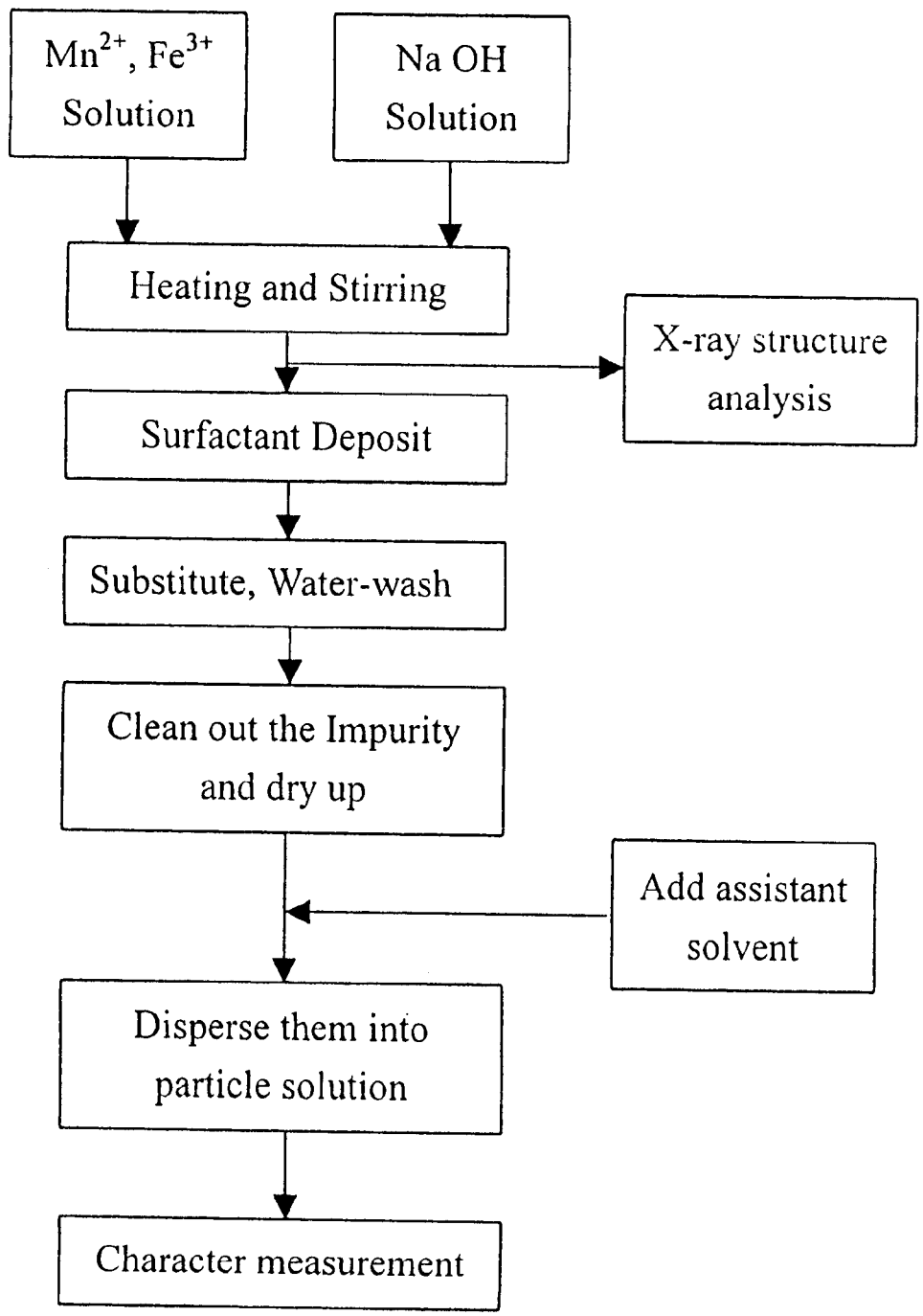
FIG. 4 The manufacturing flow chart of this invented magneto-flux

The manufacturing flow chart of this invented magneto-flux is shown in FIG. 4, and the chemical co-precipitation method is applied to implement it. At the beginning, we mix the solution of $MnSO_4.7H_2O$ and $FeCl_3.6H_2O$. After adding 8M's NaOH into it, then steadily heating and stirring that solution. Under particularly PH controlled process, the micro $MnFe_2O_4$ particles will be produced during the heating procedures.

As soon as the above procedures are finished, adds Oleic acid into that solution to formulate the Oleic-Sodium that is due to the combination of Oleic acid and NaOH. Consequently the Oleic-Sodium will absorb the micro $MnFe_2O_4$ particles, and then it will stably become an ionic compound. Waiting the solution cool down to the room temperature, add HCl to precipitate the particles and restore the Oleic-Sodium back to Oleic acid. In the mean time, we shall clean out the redundant deposit, and make the micro $MnFe_2O_4$ particles to form a single Oleic coated-layer.

After the $MnFe_2O_4$ particles accumulated, we shall remove the moistures and add the de-ionized solvent to remove the impurity and other complex compounds. Furthermore, retrieve the particles with a specified quantity of Kerosene, clean out the impurity residues, and then centrifugally remove all of Kerosene and large particles. Moreover, add acetone into it and keep them in oven to dry out moistures completely. Finally puts the particles into Kerosene and centrifugally processes it with low-speed, then the upper layer of object is the magneto-flux material as needed.

Figure 5:
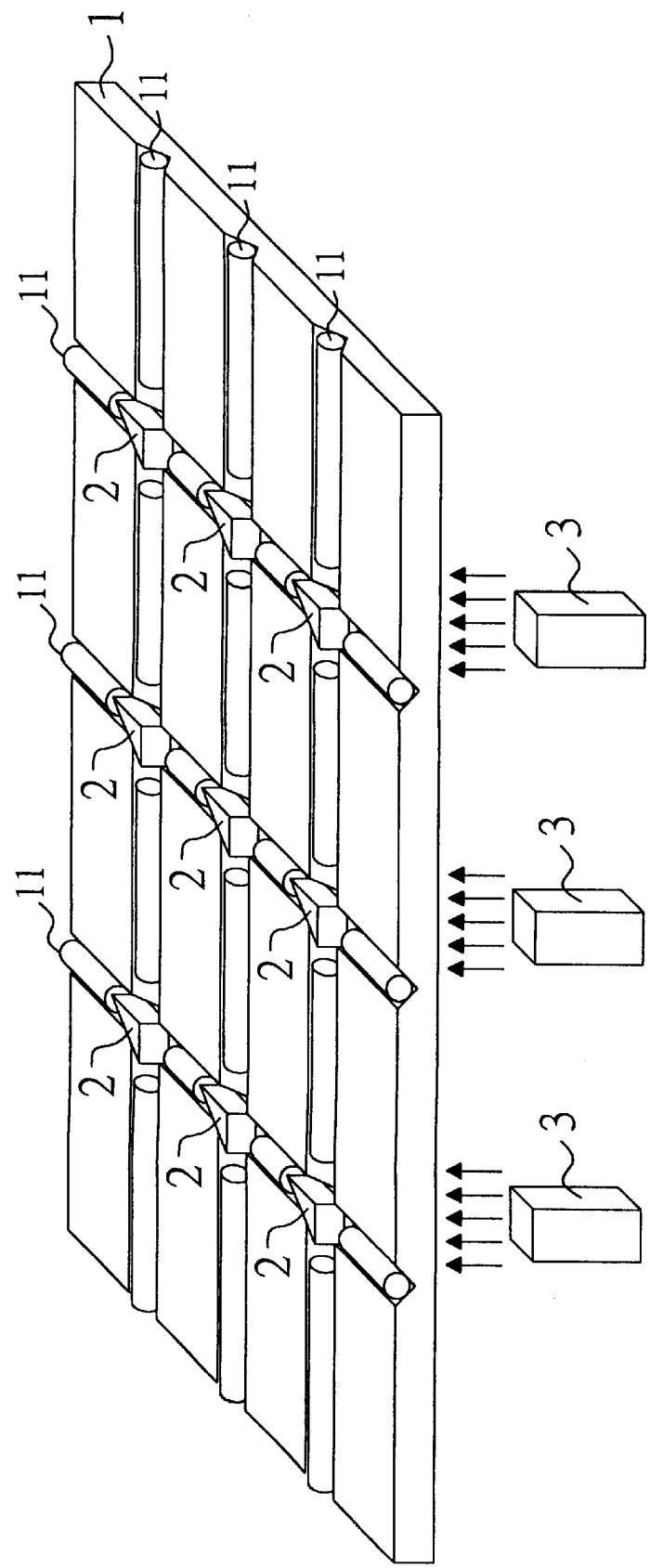
FIG. 5 The implementation of this invention

The implementation of this invention is shown in FIG. 5. Firstly put couple of magneto-flux prisms 2 and magnetic field generator 3 separately at the intersection of the optical route 11 of that micro magneto-controlled optical path-guiding platform 1. Conclusively, we can achieve the goal to change the traveling direction of an optical signal by individually controlling the magnetic field intensity, which is generated by each of magnetic field generators.

Figure 6:
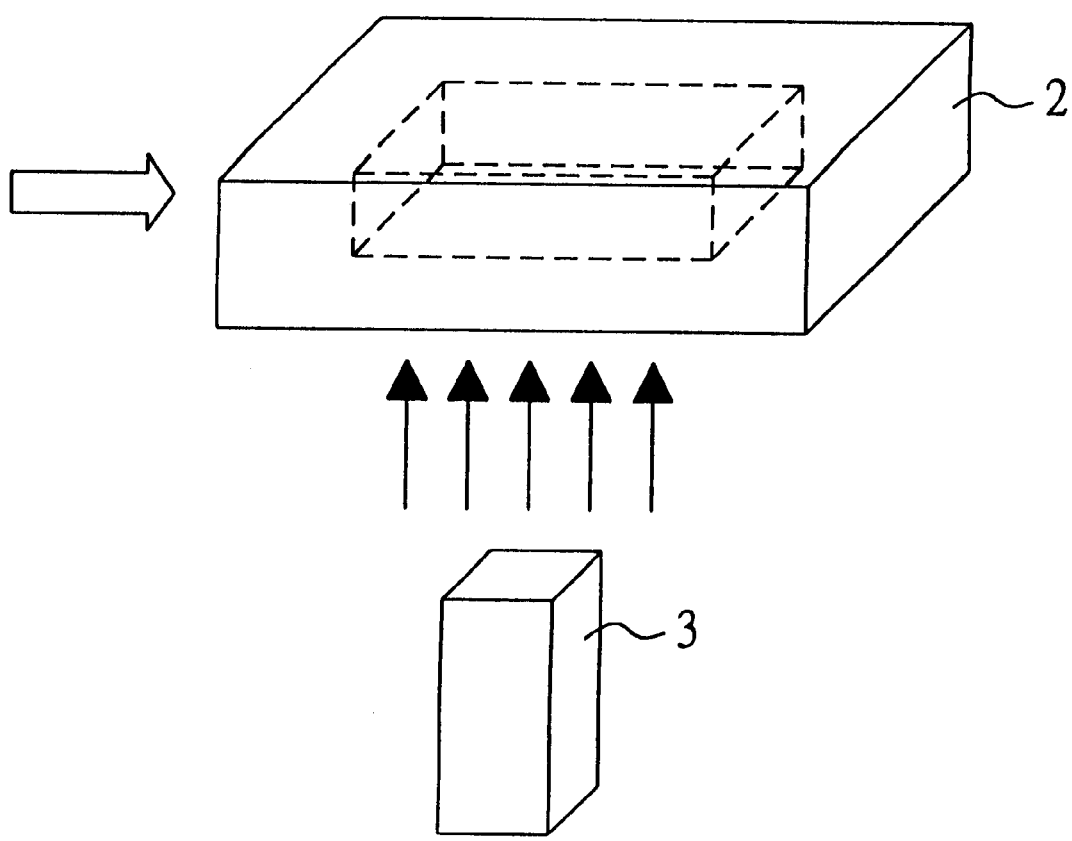
FIG. 6 The configuration of this invented optical controller Symbol Code

The configuration of this invented optical controller is shown in FIG. 6. This optical controller comprises of magneto-flux prism 2 and magnetic-field generator 3. If the optical controller is located within the optical traveling route, it can perform as an optical switch, an optical isolator, or an optical attenuator.

The present invention specially discloses and describes selected the best examples. It is to be understood, however, that the present invention is not limited to the specific features shown and described. The present invention is claimed in any forms or modifications within the spirit and the scope of the appended claims.

What is claimed is:

1. A micro magneto-controlled optical path-guiding platform, comprising:
    a optical path-guiding platform containing couples of optical route;
    more than one magneto-flux prism, which are located at the intersection of the optical route being on the topside of optical path-guiding platform; and
    more than one magnetic-field generator, which are mounted on the bottom side of the optical path-guiding platform and is oppositely located under the micro magneto-flux prism.

2. A micro magneto-controlled optical path-guiding platform of claim 1, wherein the optical path-guiding platform is produced under an integrate manufacturing process.

3. A micro magneto-controlled optical path-guiding platform of claim 1, wherein the optical route is formalized with array pattern on the optical path-guiding platform.

4. A micro magneto-controlled optical path-guiding platform of claim 1, wherein the substrate can be located at a suitable position within the optical routes, and then the microball lens will be configured on the optical path-guiding platform.

5. A micro magneto-controlled optical path-guiding platform of claim 1, wherein the micro magneto-flux prism will change the reflection and refraction ratios to the different incident light by interacting with the external magnetic field intensity and orientation.

6. A micro magneto-controlled optical path-guiding platform of claim 1, wherein the micro magneto-flux prism consists of one hollow prism and one magneto-flux.

7. A micro magneto-controlled optical path-guiding platform of claim 1, wherein the magnetic field generator can be consisted of a high magneto-intensity coil and an electric power source.

8. A micro magneto-controlled optical path-guiding platform of claim 1, wherein the magneto-orientation of the magnetic field generator is perpendicular to the direction of the incident light traveling through the micro magneto-flux prism.

9. A micro magneto-controlled optical path-guiding platform of claim 3, wherein the optical route can be configured by an optical wave-guide.

10. A micro magneto-controlled optical path-guiding platform of claim 3, wherein the optical route can be consisted of the slots on the optical path-guiding platform and the allocated fibers inside the slots.

11. A micro magneto-controlled optical path-guiding platform of claim 3, wherein the optical route can be consisted of the slots on the optical path-guiding platform, the allocated fibers inside the slots, and the optical wave-guide.

* * * * *